United States Patent [19]
Baer

[11] Patent Number: 5,181,223
[45] Date of Patent: * Jan. 19, 1993

[54] HIGH-EFFICIENCY MODE-MATCHED TRANSVERSELY-PUMPED SOLID STATE LASER AMPLIFIER

[75] Inventors: Thomas M. Baer, Mountain View, Calif.

[73] Assignee: Spectra-Physics, Incorporated, Mountain View, Calif.

[*] Notice: The portion of the term of this patent subsequent to Nov. 15, 2005 has been disclaimed.

[21] Appl. No.: 714,790

[22] Filed: Jun. 12, 1991

Related U.S. Application Data

[63] Continuation of Ser. No. 404,162, Sep. 6, 1989, abandoned, which is a continuation-in-part of Ser. No. 360,848, Jun. 2, 1989, abandoned, which is a continuation of Ser. No. 195,713, May 18, 1988, Pat. No. 4,837,771, which is a continuation-in-part of Ser. No. 103,557, Sep. 30, 1987, Pat. No. 4,785,459, which is a continuation-in-part of Ser. No. 35,530, Apr. 7, 1987, Pat. No. 4,756,003, which is a continuation-in-part of Ser. No. 811,546, Dec. 19, 1985, Pat. No. 4,656,635, which is a continuation-in-part of Ser. No. 730,002, May 1, 1985, Pat. No. 4,653,056.

[51] Int. Cl.$^5$ ............................................. H01S 3/09
[52] U.S. Cl. ......................................... 372/69; 372/93; 372/107; 372/75; 372/70
[58] Field of Search .................. 372/69, 92, 93, 107, 372/70, 34, 108, 75, 101

[56] References Cited

U.S. PATENT DOCUMENTS

| | | | |
|---|---|---|---|
| 3,736,518 | 5/1973 | Anderson et al. | 372/75 |
| 4,383,318 | 5/1983 | Barry et al. | 378/70 |
| 4,555,786 | 11/1985 | Byer | 378/34 |
| 4,703,491 | 10/1987 | Lim | 372/93 |
| 4,710,940 | 12/1987 | Sides, Jr. | 372/75 |

Primary Examiner—Léon Scott, Jr.
Attorney, Agent, or Firm—Kenneth D'Alessandro

[57] ABSTRACT

In a laser amplifier a high efficiency pumping scheme mode matches the TEM00 laser mode volume with a plurality of linearly spaced laser diode pumping sources positioned along a lateral side of a block of laser material. The optical path within the block is configured in a tightly folded zig-zag configuration. Pump radiation from the diode pumping sources is collimated by an optical fiber end the fold angle is selected to mode match the pump radiation to the mode volume.

A laser oscillator is followed by one or more cascaded amplifier stages including a block of laser material arranged in a tightly folded zig-zag configuration. Pump radiation from the diode pumping sources is collimated by an optical fiber and the fold angle is selected to mode match the pump radiation to the mode volume.

23 Claims, 10 Drawing Sheets

HIGH-EFFICIENCY MODE-MATCHED TRANSVERSELY-PUMPED SOLID STATE LASER AMPLIFIER

BACKGROUND OF THE INVENTION

RELATED APPLICATIONS

This application is a continuation of application Ser. No. 07/404,162, now abandoned filed Sep. 6, 1989, which is a continuation-in-part of Ser. No. 360,848, filed Jun. 2, 1989, now abandoned, which is a continuation of Ser. No. 195,713, filed May 18, 1988, now U.S. Pat. No. 4,837,771, which is a continuation-in-part of Ser. No. 103,557, filed Sep. 30, 1987 now U.S. Pat. No. 4,785,459; which is a continuation-in-part of Ser. No. 035,530 filed Apr. 7, 1987 now U.S. Pat. No. 4,756,003; which is a continuation-in-part of Ser. No. 811,546 filed Dec. 19, 1985, now U.S. Pat. No. 4,656,635, issued Apr. 7, 1987, which is a continuation-in-part of Ser. No. 730,002 filed May 1, 1985, now U.S. Pat. No. 4,653,056, issued Mar. 24, 1987.

BACKGROUND OF THE INVENTION

1. Field of the Invention

The invention relates generally to amplifier designs for solid-state lasers and more particularly to amplifier designs for transversely-pumped, diode-pumped solid-state lasers.

2. The Prior Art

Conventional optically-pumped solid-state lasers utilize broadband arc lamps or flashlamps to laterally or transversely pump the solid-state laser medium in a resonant cavity. The direction of pumping is transverse or orthogonal to the longitudinal axis of the resonant cavity. The entire medium is pumped so there is little correspondence between the pump volume and the TEM00 mode volume defined by the laser cavity; operation in TEM00 mode is desired. Much of the pumping energy goes into regions of the medium outside the volume occupied by the laser mode and therefore does not contribute to amplification of the laser beam. Thus pumping efficiency is low (typically a few percent).

Laser diodes form efficient pumping sources; a variety of different types of laser diodes, particularly laser diode arrays, e.g. Spectra Diode Labs Model No. 2410 GaAlAs laser diode array, in which a plurality of emitters are phase locked together, and extended emitter laser diodes, e.g. Sony Model Nos. SLD 301, 302, 303, 304 V/W, have been or can be used. U.S. Pat. Nos. 4,653,056 and 4,656,635 and patent application Serial No. 029,836 filed Mar. 24, 1987 and patent application Ser. No. 035,530, filed Apr. 7, 1987 describe a solid-state laser longitudinally end pumped by a laser diode source in which the pump volume is matched to the desired TEM00 mode volume to optimize pumping efficiency. In the longitudinal end pump configuration, the direction of pumping coincides with the longitudinal axis of the resonator cavity, and thus can be matched into the laser mode volume. U.S. Pat. No. 4,665,529, issued May 12, 1987 and patent application Ser. No. 048,717 filed May 12, 1987 describe a solid-state laser in which a laser diode source is coupled to a laser rod by means of an optical fiber to longitudinally end pump and mode match the laser. It is desirable to produce small size, low cost, high performance solid-state lasers.

Thus the resonator/pump configuration is a key feature of laser design and performance. Lateral pumping schemes do not provide mode matching and are therefore inefficient. End pumping schemes using laser diodes provide mode matching and consequently high efficiency. However, previously-available laser diodes have often been limited in power, usually under 1 W. Furthermore, even with higher power laser diode sources, the end pumped configuration limits the amount of energy that can be used, thereby limiting the power of the laser, since the power densities in the pump region of the gain medium become too high and the heat produced cannot be removed. This heat is disadvantageous in that it causes thermal focusing and bulk heating leading to general inefficiency. Accordingly, it is desirable to provide a resonator configuration which combines a transverse or lateral pump geometry with mode matching of the pump volume to the TEM00 mode volume since lateral pumping allows more energy to be input into the medium while mode matching uses the pump energy more effectively.

Another type of laser diode is a plurality of laser diode arrays fabricated into a multi-element bar structure. These laser diode array bars typically have ten 1 W laser diode arrays spaced along a 1 cm bar; each array has multiple emitters phase locked together. These array bars are not suitable for end pumping a solid-state laser but could be useful for transversely or laterally pumping a solid-state laser. However, if the bars are used as mere substitutes for arc lamps, little benefit will be derived. Accordingly it is necessary to develop a laser amplifier/pump configuration in which the output of the laser diode array bar can be mode-matched to a desired mode volume (TEM00) within the solid-state laser material.

It is sometimes desireable to obtain laser power outputs greater than 10 watts. However, at these power levels, at least two problems occur which prevent realization of larger power outputs. First, pump power must be increased. As the pump power increases, the laser rod heats up, thus reducing laser efficiency. Cooling of the rod is difficult.

Secondly, and as a result of the heating, thermal gradients form in the laser medium, giving rise to the thermal focusing phenomenon resulting from differing indices of refraction in adjacent portions of the crystal at differing temperatures. This thermal focusing can result in damage to the laser medium. Thus it is always desireable to limit the thermal focal lengths in the laser medium to values much larger then the optical path through the medium, to avoid damage to the crystal structure. It is therefore desired to provide a laser having a high power output which avoids these problems.

Optical amplifiers provide a useful means of increasing the power level of a laser beam. These devices have found applications in tunable dye laser amplification, lightwave communication, laser fusion, and many other laser systems. Several different types of optical amplifiers currently exist. Most of these amplifiers are pulsed since it is easier in pulsed systems to obtain the levels of population inversion necessary for large gain.

Recently, continuous wave optical amplifiers have been designed based primarily on rare earth doped fibers. These designs utilize diffraction-limited laser diodes as pump sources. These diodes are coupled into a single mode fiber doped with Nd or Er. The pump light is guided along the fiber and excites a long narrow column of rare earth ions. The signal wave (at the lasing wavelength of the rare earth ion) is also injected into the fiber and is guided along the same path as the pump. The signal wave is amplified by stimulated emission from the rare earth ions. There are several limitations to fiber laser amplifiers. First they require that the pump beam be near diffraction limited to couple into the single mode fiber. This limits the amount of power that can be effectively used to pump the amplifier. The limited amount of pump restrict the total amount of power that one can extract from the amplifier. Second, the range of wavelengths that can be amplified is limited to those ions and transitions that are compatible with fiber laser manufacturing techniques. Third, in order to extract high power from the amplifier a large population inversion is necessary. The large population inversion gives rise to very high small signal gains which leads to amplified spontaneous emission and lasing off of spurious reflections. Fourth, the lasing transition in glass fibers is primarily imhomogenously broadened. Thus it is difficult or impossible for a narrow bandwidth signal beam to efficiently saturate the active medium. This leads to significant undepleted gain in the fiber amplifier causing excess noise and the potential for lasing off of spurious reflections.

Thus alternative designs are necessary to obtain optical amplifiers that permit the extraction of high power and allow high gain. It is important that the lasing transitions of the amplifier be homogeneously broadened so as to allow uniform saturation of the excited active medium across the laser gain profile. The amplifier should be configured to allow the flexibility to adjust the pump volume region so as to achieve useful gain (10 dB) and yet allow the extraction of high average powers (hundreds of milliwatts to watts).

In order to extract high power, the laser diode pump power must be efficiently coupled into the volume area occupied be the incident signal beam. Moreover the size of the pump beam must be adjusted to provide sufficiently high gain along the path of the signal beam. In general this means minimizing the pump volume along this path. It is also important that parasitic oscillations in the amplifier be eliminated by reducing or eliminating feed back along optical paths within the amplifier. Finally it is important to design the pumping scheme of the amplifier to minimize optical distortion of the signal beam as it propagates through the amplifier.

OBJECTS OF THE INVENTION

Accordingly it is an object of the invention to provide a mode-matched transverse laser diode-pumped solid-state laser amplifier.

It is also an object of the invention to provide a mode-matched solid-state laser amplifier pumped by a laser diode array bar.

It is a further object of the invention to provide a solid-state laser amplifier configuration which provides for efficient mode-matched pumping by a multi-element laser diode pump source.

It is another object of the invention to provide a mode-matched laser diode-pumped solid-state laser amplifier which is pumped from a lateral side of the gain medium.

It is also an object of the invention to provide a solid-state laser amplifier in which a plurality of laser diode pump sources spaced along a lateral side of the gain medium are mode-matched to the TEM00 mode.

Yet another object of the present invention is to provide a solid-state laser amplifier capable of achieving higher output power than previously possible without damage from thermal focusing.

Yet a further object of the present invention is to provide a laser amplifier wherein the lasing transitions are homogeneously broadened.

SUMMARY OF THE INVENTION

The invention is a solid-state laser amplifier pumped by a plurality of discrete laser diode pump sources extending along a transverse or lateral face of a block of laser material which are mode-matched to the resonator mode volume. Preferably, the pump source is a plurality of laser diode arrays which have been fabricated into a multi-element bar structure.

According to one aspect of the present invention, efficient optical pumping of the solid-state laser amplifier is accomplished by mode matching the laser diode array output to the TEM00 mode within the solid-state laser material in a tightly folded configuration. By configuring the optical path in a tightly folded resonator between a pair of transverse or lateral sides of the gain medium, the pump radiation can be directed longitudinally into the mode volume. Mode matching is accomplished by matching the cavity mode volume to the divergence of the laser diode emission. A cylindrical collimating lens, preferably a length of optical fiber, is mounted parallel to and in a spaced relation with the diode bar by precision spacer means to substantially collimate the diode emission in one direction (normal to the diode bar-laser gain medium junction). The diameter of the fiber and its refractive index are chosen to match the pumped region to the size of the laser mode. In the other direction (in the resonator plane) the divergence of the laser diode emission (often a two lobe pattern) is matched to the fold angle of the zig-zag path of the TEM00 beam through the block of solid-state laser material.

In a another aspect of the present invention, a block of solid state laser material is longitudinally pumped by a plurality of laser diode pump sources which are mode matched to the TEM00 mode within the solid-state laser material. The optical path through the block of solid state laser material is a zig zag. The pump radiation is directed along the individual legs of the optical path. The pump radiation from each laser diode pump source is collimated and is directed longitudinally at the block of solid state laser material at an angle chosen such that the optical path of the pump radiation in the bar will coincide with one leg of the optical path in the block. Mode matching is accomplished by matching the cavity mode volume to the divergence of the laser diode emission.

Another aspect of the invention includes cascading one or more laser amplifier stages disclosed herein. The first amplifier is fed by the output of a solid-state laser. Mode matching is accomplished as previously described. The laser output of the first amplifier is provided to an identical second amplifier, and so on, through a desired number of cascaded stages, until the desired output power is achieved. At present, it is believed that up to four amplifier gain stages may be employed if pulse mode operation is desired. In CW mode, the practical limit occurs when the loss per stage, multiplied by the average power into that stage, equals the amount of power gained by that stage.

BRIEF DESCRIPTION OF THE DRAWINGS

In the accompanying drawings:

FIG. 9b is a graph of amplifier output versus pump power for an exemplary laser amplifier of the type shown in FIG. 9a.

DETAILED DESCRIPTION OF THE PREFERRED EMBODIMENTS

The invention is a solid-state laser having a resonator/pump geometry which provides effective coupling of high average power laser diode bars to the solid-state laser active medium and having one or more cascaded amplifier stages following an oscillator stage. The invention utilizes a laser cavity having a tightly folded zig-zag configuration within a block of laser material so that a laser diode bar placed along a transverse or lateral face of the block of laser material can be mode-matched to the TEMOO mode volume. This solid-state laser oscillator optimizes the overlap between the lasing TEMOO mode and the regions pumped by the diode bar, using optional simple collimating optics and the fold angle of the resonator cavity for both the oscillator and amplifiers. By folding the resonator cavity, the longitudinal axis of the resonator can be made substantially normal to a transverse or lateral side of a block of laser material, instead of being parallel to the sides, so that the resonator cavity can be pumped quasi (nearly) longitudinally at a number of spaced intervals along the sides instead of merely from an end.

Figure 1:
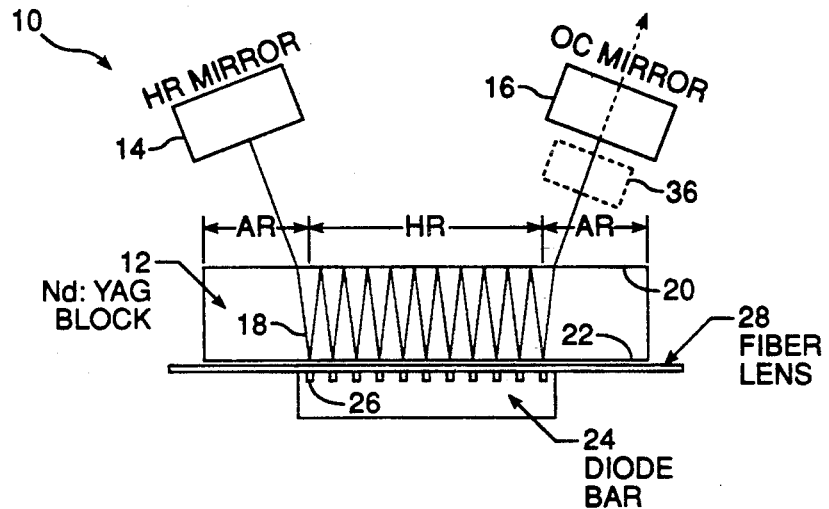
FIG. 1 is a top plan view of a transversely by a diode bar mode-matched solid-state laser pumped.

A solid-state laser 10, and shown in FIG. 1, is formed with a block 12 of Nd:YAG, Nd:YLF, Nd:YVO₄, or other solid-state laser material. It is preferable that the solid state laser material be homogeneously broadened. Laser cavity forming means, e.g., a mirror 14 which is highly reflective to the laser radiation and an output coupler mirror 16 which is partly transmissive to the laser radiation are positioned around the block 12 to form a laser cavity which extends within the block 12. The mirrors 14, 16 are oriented at angles to block 12 so that the resonant cavity configuration within block 12 is a tightly folded zig-zag 18 at a preselected fold angle between a pair of opposed lateral sides 20, 22 of block 12. As illustrated, mirrors 14, 16 are on the same side of block 12 but can also be on opposite sides.

The surface of side 20 is coated with a suitable anti-reflection (AR) coating; further coating layers which form a high reflectively (HR) coating are placed on the portions of sides 20, 22 where the laser beam is to be reflected back into block 12. As shown, the region of side 20 between the two entrance/exit points of the laser beam has an HR coating, while all of side 22 could have an HR coating. The coatings are further described herein. Diode bar 24, placed along side 22, forms the pumping source. Diode bar 24 contains a plurality of separate laser diode arrays 26 spaced along its length. The emissions from laser diode arrays 26 on bar 24 are matched to the mode volume of laser 10 by means of a fiber lens collimator 28 and by selecting the fold angle of the zig-zag portion 18 of the resonator to match the divergence of diode arrays 26, as will be further explained below. An optional intra-cavity element 36 may also be included, as described herein. In some cases, collimator 28 may be unnecessary; diode arrays 26 could be butted against block 12.

Figure 2:
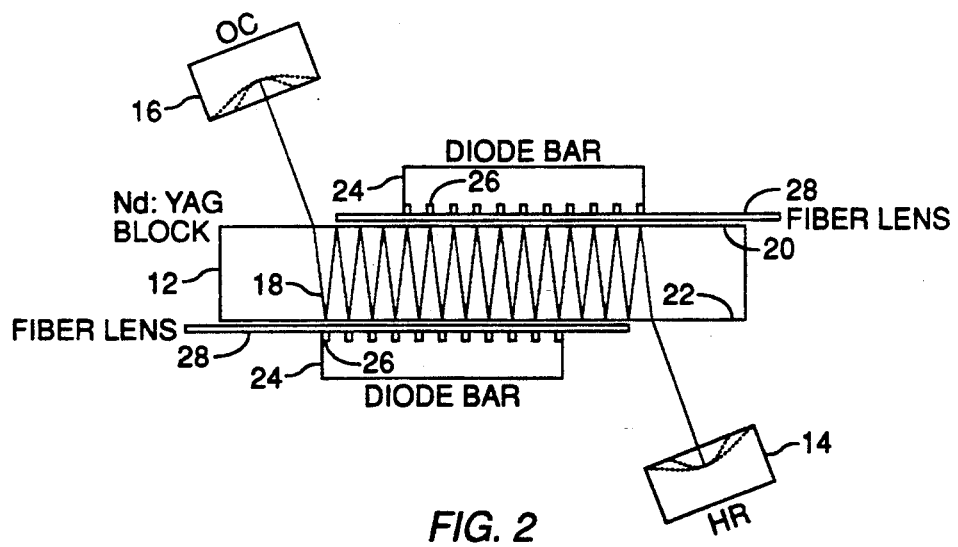
FIG. 2 is a top plan view of a mode-matched solid-state laser pumped transversely by a pair of laser diode bars.
Figure 3A:
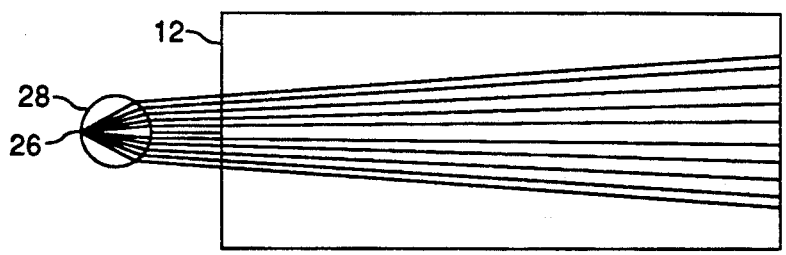
FIGS. 3A-E are ray tracing diagrams of the collimation of a laser diode bar at various distances from a fiber optical collimator.
Figure 3B:
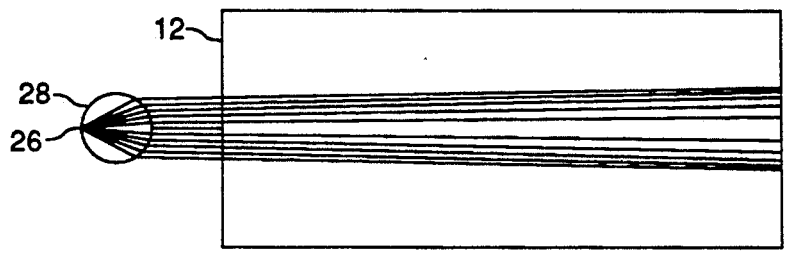
Figure 3C:
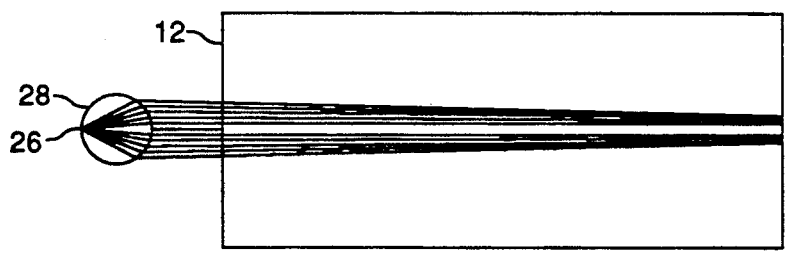
Figure 3D:
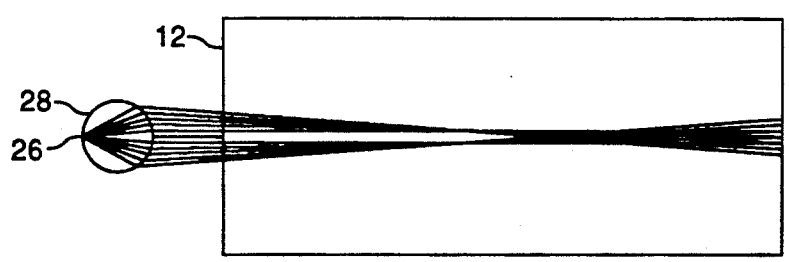
Figure 3E:
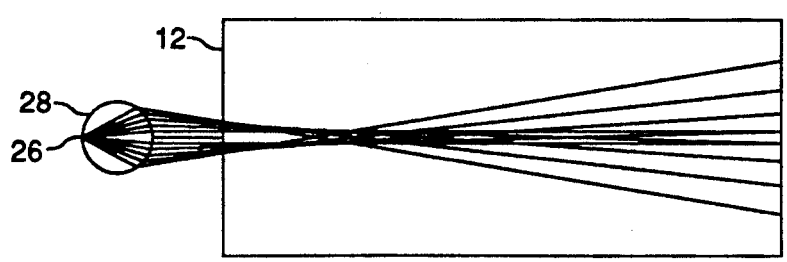

A variation of the basic embodiment which uses a pair of diode bars to pump the solid-state laser is shown in FIG. 2. A separate diode bar 24 is placed along each side 20, 22 of block 12 of laser material to pump the zig-zag portion 18 of the resonator within block 12. Highly reflective mirror 14 and output coupler 16 are on opposite sides of block 12 to form the resonant cavity and are oriented to produce the desired fold angle. Each diode bar has a plurality of separate diode arrays 26 which are collimated by a fiber lens 28.

Many different embodiments of the basic elements are possible; one, two, three or more diode bars can be used, with the bars on one side or both sides of the block of laser material. The cavity forming mirrors can be on the same or opposite sides of the block. Each fold in the resonator can be pumped by a laser diode array, or only every other fold, or every third fold, etc.; the folds can be pumped from only one side or from both sides.

The great advantage of this resonator configuration is that the pump volume can be very closely matched to the mode volume in the resonator. As those of ordinary skill in the art will readily appreciate, the positions and shapes of mirrors 14, 16 will determine the mode 13 volume within the resonator; TEMOO mode is highly desirable because of its single lobe pattern. The resonator configuration allows a plurality of discrete pumping sources, preferably separate diode arrays, spaced along a multi-element diode bar, to be placed along a lateral side or a pair of opposed lateral sides so that a much greater portion of the laser gain medium can be pumped, and to maximize the efficiency by matching the pumping volume of all the diode arrays to the desired mode volume of the resonator. The result is a configuration of very high efficiency and very high gain.

A preferred embodiment of the laser diode bars has ten one-watt diode arrays located on a 1 cm piece of GaAs. The individual arrays are 200 microns wide and are spaced 1 mm apart. These diode bars are preferred because (1) all the diode laser wavelengths on the bar will be closely matched since they are manufactured on the same monolithic piece of GaAs, (2) spacing the diodes 1 mm apart reduces thermal loading of the substrate, and (3) combining many diodes on a bar reduces packaging cost and improves yields. However, different arrangements of diode bars can be utilized, e.g., different number or spacing of the individual arrays. Alternatively, in place of a diode bar containing many discrete arrays, a plurality of separate individual diode arrays could be positioned along the side of the block. The diode arrays often have a two lobe pattern with a greater divergence in the direction normal to the plane of the bar; the divergence is typically about 7° full angle in the plane of the bar (lobe to lobe) or a numerical aperture (N.A.) of about 0.15, and 28° or 0.6 N.A. in the plane normal to the bar. Thus matching the pump beam to the mode volume in the direction normal to the plane of the bar is more difficult and requires some additional optics.

A preferred embodiment to collimate the output of the diode bar uses an optical fiber as a cylindrical lens. A typical resonator configuration has a 200-300 micron wide beam; therefore a 300-400 micron cylindrical lens would be suitable. Typical multimode optical fibers have this diameter and will form a good low cost collimator provided the fiber can be positioned in a manner that will collimate all the individual spaced arrays. Thus although a fiber could be used to collimate a single array, it is necessary to provide a means for using a fiber to collimate the whole bar. FIGS. 3A-E show the collimation of the output of a laser diode array 26 by an optical fiber 28 having a refracture index of 1.8 into a solid-state laser block 12. The diode arrays are spaced at 1, 10, 20, 30 and 50 microns, respectively, from fiber 28 of about 250 microns diameter. At 1, 10 and 50 microns spacing the beam is not sufficiently collimated. Thus, in order to use an optical fiber to collimate the arrays on a diode bar, the fiber must be held at a spacing of 30±10 microns (i.e. about 20-40 microns) along the entire bar.

Figure 4:
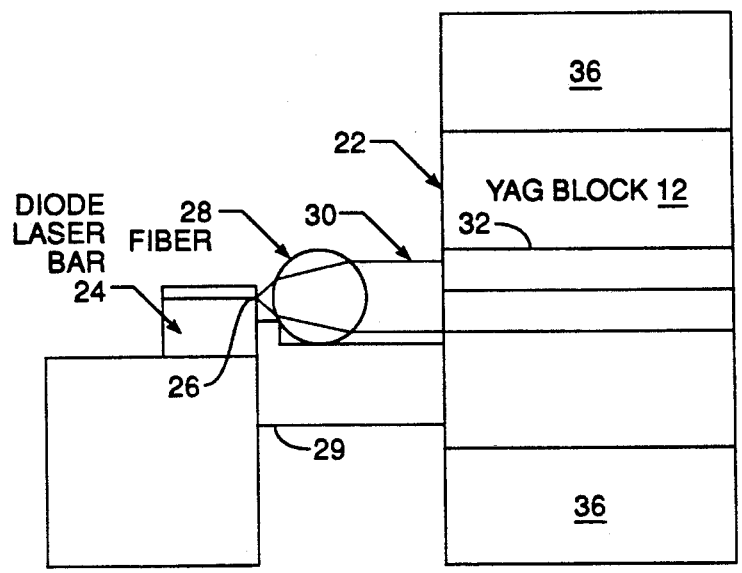
FIG. 4 is an end view of a laser diode bar with fiber optical collimator.

As shown in FIG. 4, an optical fiber 28 is mounted in a spaced relationship with diode bar 24 so that the output from each laser diode 26 is substantially collimated to a pump beam 30 which is incident into lateral side 22 of YAG block 12. Side 22 has a coating which is highly transmissive to the pump radiation (typically about 800 nm) but reflective to the laser radiation. The diameter of fiber 28 is chosen to produce a pump beam 30 with a diameter which substantially matches (is slightly smaller than) the diameter of the laser beam 32, thereby mode matching the pump beam to the mode volume in one direction (normal to the plane of the resonator). The fiber 28 is positioned relative to the diode bar 24 by means of a precision spacing means 29, e.g., a copper heat sink with steps, with diode array 26 approximately at the focus so the radiation will be collimated. Precision spacing means 29 maintains fiber 28 in a precise parallel spaced relationship with bar 24 along its entire length to collimate the output of all the arrays 26 into a line of light. Typically the gap between the diode bar and fiber is about 20-40 microns and the distance between the diode bar and YAG block is about 450 microns. Although an optical fiber is not a perfect collimator because of spherical aberration which causes beam spread, the pump energy will be absorbed in a relatively short distance within the laser medium (an absorption length) so that the spread is negligible and the optical fiber is a highly effective collimator when it is correctly positioned in the manner described. This collimated laser diode bar in itself is also considered a part of the invention.

Figure 5:
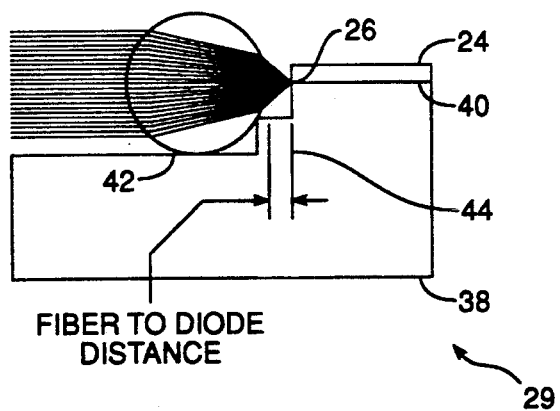
FIG. 5 is an end view of a fiber-optic collimated laser diode bar.
Figure 6:
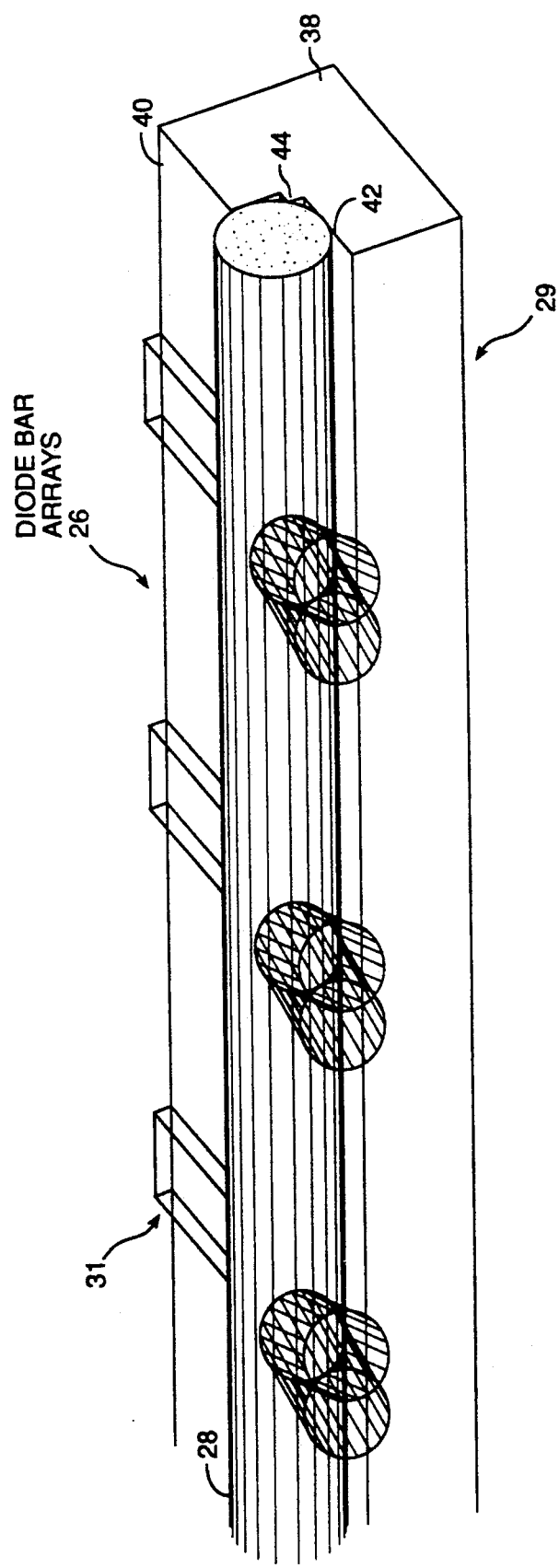
FIGS. 6 and 7 are perspective views of two embodiments of a fiber-optic collimated laser diode bar.
Figure 7:
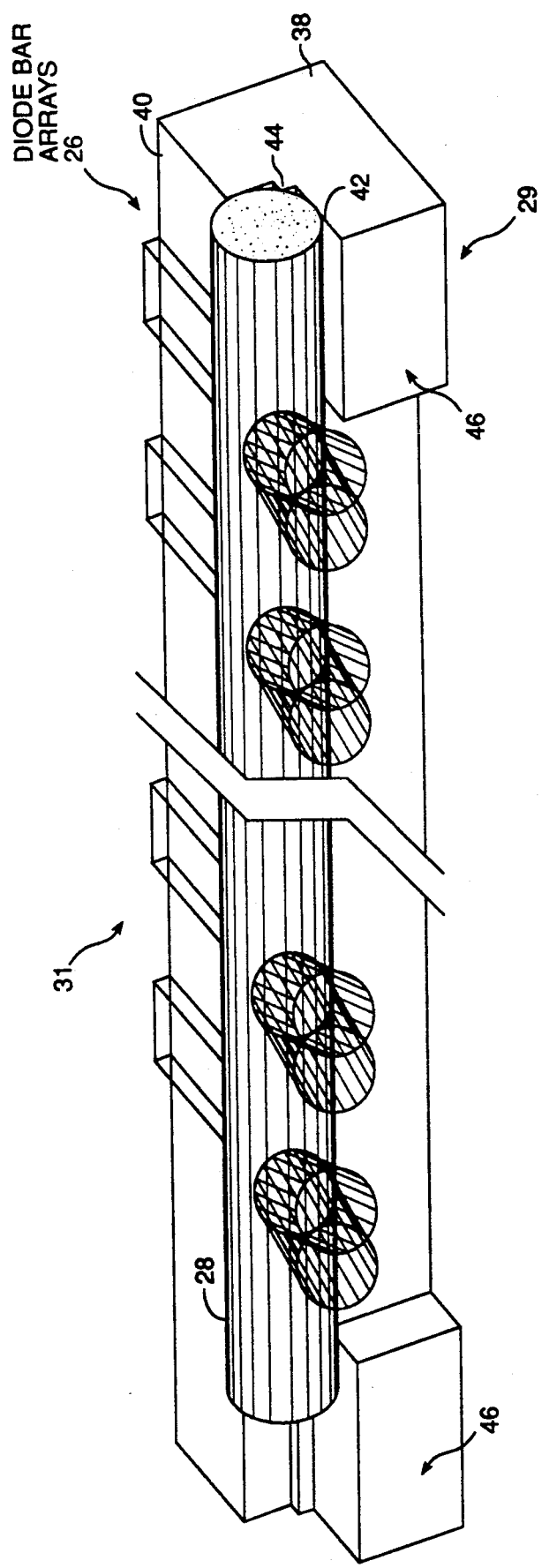

A preferred embodiment of a fiber optic collimated laser diode bar 31 is illustrated in FIG. 5. The spacing means 29 is formed of a multi-step copper or other heat sink 38. The diode bar 24 which contains arrays 26 is mounted on one step 40 while the fiber 28 is mounted (e.g. epoxied) onto a lower step 42. Steps 40 and 42 are separated by an intermediate step 44 against which the fiber 28 is positioned to maintain the correct fiber to diode working distance (about 30 microns) along the length of bar 24 (about 1 cm). The fiber diameter is typically about 250-350 microns, or other suitable multimode fiber diameter depending on the mode volume, to collimate the arrays. A pair of embodiments of the collimated laser diode bar of FIG. 5 are shown in FIGS. 6 and 7. In FIG. 6 the steps 42 44 for mounting the fiber 28 are formed along the entire length of spacer 29 (heat sink 38) while in FIG. 7 the steps 42, 44 are formed only at the ends 46 of spacer 29. The diode arrays 26 are formed or mounted on step 40. Pump beams 30 from arrays 26 are collimated in one direction but still have two lobe divergence in the other. An alternate method of precision spacing the fiber from the diode bar is to use UV curing epoxy, and to apply the UV when the collimation is acceptable or to use a standard two part epoxy, or other adhesive to space the fiber. Any precision spacer or adjustment means which can maintain end-to-end variation of ±10 microns along the bar length (1 cm) can be used.

Figure 8:
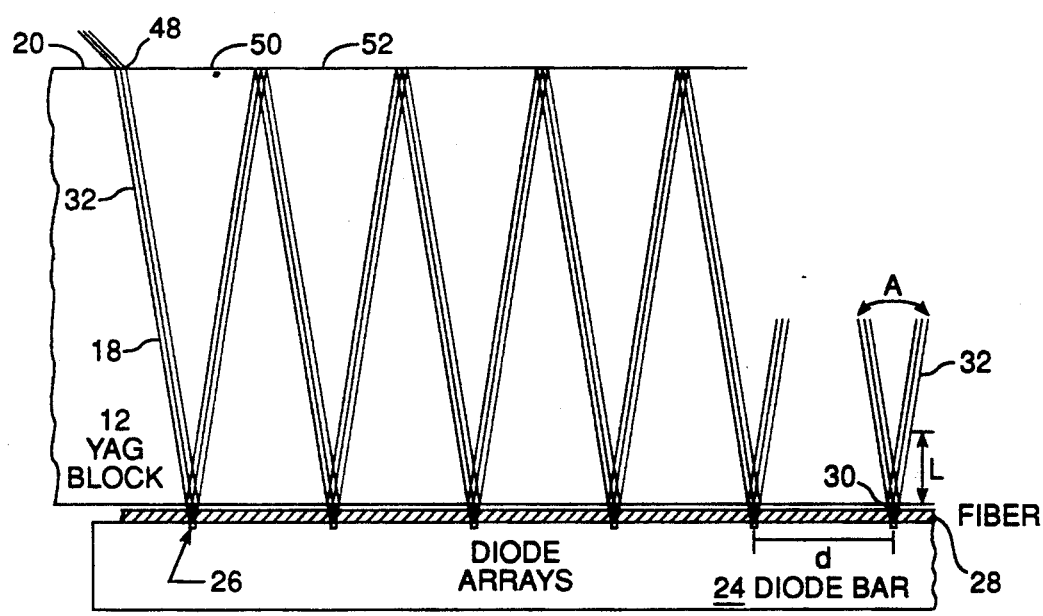
FIG. 8 is a top plan view of a plurality of diode arrays matched to the mode volume in a solid-state laser cavity having a tightly folded zig-zag configuration.

Once the pump beam is mode-matched in one direction, as previously described, it must also be matched in the other direction (in the plane of the resonator). As shown in FIG. 8, the individual diode arrays 26 are separated by a distance d, preferably 1 mm, on diode bar 24. Pump beam 30 is collimated by fiber 28 in the direction normal to the resonator plane so the pump beam width in that direction is slightly smaller than the width of the laser beam 32. In the plane of the resonator, the mode volume in the tightly folded portion 18 of the resonator is matched to the divergence of diode arrays 26. Frequently, the diode arrays produce a two lobe output so that one lobe goes into each portion of the V in the folded beam. The mode matching is accomplished by controlling the fold angle A. The diameter of laser beam 32 is typically about 300 microns. The resonator geometry and beam mode volume must be such that the beams at the vertices do not overlap, so that the laser beam can exit the block of laser material at the edge of the highly reflective coating on the block surface. The fold angle A is very steep, typically 5°. The configuration is totally different from the conventional zig-zag slab laser in which the zig-zag is produced by total internal reflection (TIR) of the beam; in the present invention the fold angle is too steep for TIR. The laser diode beam may be single lobe, e.g., as produced by the Sony extended emitter laser diodes. Accordingly it is desirable to produce a folded zig-zag configuration where the distance L at which the beam 32 does not overlap between the V (i.e. the two parts of the V totally separate) is equal to or greater than the absorption length of the pump beam radiation in the particular laser medium. Therefore, the fold angle will depend on the diode array spacing and ability to remove the beam from the zig-zag portion of the resonator. The diodes need not pump every single fold, but may pump every other fold. The fold angle can be made very steep, particularly in the case of a single lobe pump beam so that the pump beam direction most closely coincides with the longitudinal axis of the laser beam in the region of the laser beam where the pump radiation is absorbed by the gain medium. The fold angle is adjusted, be means of the cavity forming means, to follow out the intensity distributions of the pump source with the TEM00 mode and maximize overlap.

A number of different factors must be considered to design the cavity, as illustrated by the following preferred embodiment. First is the block of laser material. A YAG block 5 mm×5 mm×20 mm can be produced, machined flat to half a wavelength over the whole length. Thus the length of the folds (distance between the two lateral sides) will typically be about 5 mm. Next is the laser beam mode volume. The radius of the cavity forming mirrors is typically 30–100 cm, and the mirrors are placed about 2 cm from the laser block. With ten folds (20 passes across the block) the total cavity length is about 15 cm, and has a $1/e^2$ beam diameter of about 300 microns. A 300 micron beam is desirable because the diode arrays are 200 microns and can be matched to the mode volume for maximum pumping efficiency. However changing the cavity (mirror radius) can produce other beam sizes which may be suitable in other embodiments, e.g. if a 0.5 cm diode bar is used with ten 0.5 W arrays of 100 micron diameter (also with a suitable narrower fiber collimator).

In order to remove the beam from the block, the beam must pass through a region that is not reflecting (i.e. only AR coated) and skim by a region that is highly reflecting (HR coated). As a general rule, the aperture must be about 3 times the $1/e^2$ beam radius to avoid significant diffraction losses. Thus for a TEM00 beam diameter of 300 microns, the nearest edge must be about 500 microns. As shown in FIG. 8, beam 32 exits side 20 at point 48. The distance between folds is about 1 mm. Thus point 50 which is directly across from the first diode array 26 is about 500 microns from exit point 48. Thus the HR coating should end sharply at point 50 so the beam can exit without significant diffraction loss. The coating method uses a precision mask to match the end to end length of the block. The mask is very thin, e.g. 2 mils (0.002 in) for a sharp cutoff or steep edge so the beam can exit without significant diffraction loss. The coatings are conventional optical coatings. Side 2013 first coated with an AR coating, which also forms the first layer or layers of the HR coating. Any side on which there are no exit points can be completely coated with a multi-layer (e.g. 20 layer) HR coating. The central portion of the other sides is then coated with the HR layers using the mask.

A potential problem because of the high gain is the occurrence of parasitic oscillation straight across the laser medium block from the diode array, i.e. between the zig-zag folds. One solution is to coat the block surface in a series of HR stripes so the surface coating where the zig-zag folds contact the surface are highly reflective but the surface directly across from the diode array is only AR coated to create a window which will not produce resonance. The point 52 (and similar points at each fold), shown in FIG. 8, which is directly across from an array 26 should not be HR but only AR coated. This could be produced by using a coating mask which forms stripes of HR coating only where the beam reflects and leaves gaps in the HR coating (i.e. only AR coating) at points 52 (the HR coating would also be moved slightly off point 50 at the exit point). Alternatively, the entire surface beneath the mask could be HR coated and then stripes of HR coating could be removed at points 52, e.g. by a laser. Another solution is to slightly wedge the normally parallel opposed sides of one laser block; however, this may require nonuniform spacing of the diodes to compensate.

The lasers according to the invention represent a major advance in ability to effectively pump a solid-state laser using a high power diode bar pump source by mode matching to the desired TEM00 mode volume. These lasers can be made extremely compact and have very high performance characteristics. Any of the wide variety of solid-state laser materials can be used; in particular Nd:YAG and Nd:glass are two well-known materials which have been extensively used for other applications. In general, the active medium should have high slope efficiency, broad pump bands, and good thermal conductivity. A Nd:YAG laser has a very strong line at 1.06 microns and weaker lines at 0.946 and 1.3 microns, all in the IR. For operation in the visible, a frequency doubler could be added to the laser cavity, represented by intracavity element 36 in FIG. 1, producing 532 nm, 473 nm and 651 nm, respectively. Power levels of 10 W at 1.06 microns are attainable with a 3 bar pump (5 W at 532 nm). The laser has a very high CW gain; e.g., if the gain in each fold is 10–20%, a total gain of about 7–8 can be achieved. Operation is CW or pulsed by adding an intracavity Q-switch, also represented by intracavity element 36 in FIG. 1. Heat dissipation can be controlled by placing a heat sink or other heat removal means 36, shown in FIG. 4, on the top and bottom face of block 12, if necessary. The high gain of the oscillator allows the use of a lower gain laser material such as Nd:glass, which has the advantage that the absorption line is much broader than Nd:YAG so laser diode pump sources without Peltier coolers can be used.

In applications where it is desired to obtain even higher power output levels, the previously-described laser, or another laser, may be used to feed one or more cascaded laser amplifier stages configured similarly to the embodiment of FIG. 1 herein but without the resonant-cavity-forming mirrors. Such laser amplifiers are shown in FIGS. 9–14, using like reference numerals to indicate the same elements depicted in the earlier figures.

Figure 9A:
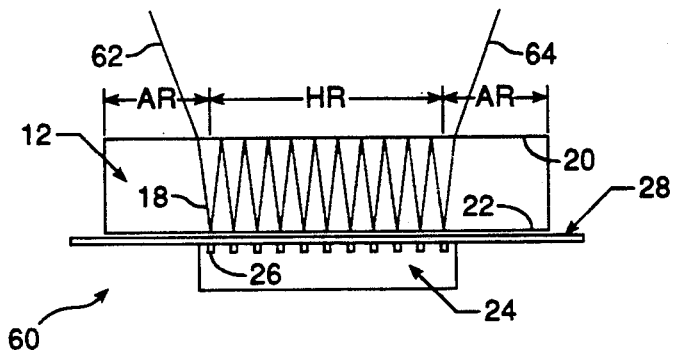
FIG. 9a is a top plan view of a laser amplifier stage according to a presently-preferred embodiment of the present invention, having its input and output on same side of the laser medium.

Referring now to FIG. 9a, a laser amplifier stage 60, which may be cascaded, is formed with a block 12 of Nd:YAG or other solid-state laser material such that a tightly-folded zig-zag 18 at a preselected fold angle between a pair of opposed lateral sides 20 and 22 of block 12 much like the embodiment of FIG. 1, except for the absence of mirrors 14 and 16. The surfaces of sides 20 and 22 are coated with a suitable optical coating as previously described. Coating layers which form an HR coating are placed on the portions of sides 20 and 22 where the laser beam is to be reflected back into block 12 as previously described.

Diode bar 24 contains a plurality of separate laser diode arrays spaced along its length. These arrays are matched to the mode volume of amplifier 60 by means of a fiber lens collimator 28 and by selecting the fold angle of the zig-zag portion 18 of the optical path to match the divergence of diode arrays 26 as previously disclosed. In some cases collimator 28 may be unnecessary; diode arrays 26 could be butted against block 12.

As previously described, the potential problem of parasitic transverse oscillation across block 12 between sides 20 and 22 may be avoided by (1) employing an AR coating to create windows directly across from diode arrays 26, (2) selectively destroying the HR coating in this area to increase the losses, or (3) by slightly wedging the normally parallel sides 20 and 22 of block 12.

A laser beam 62 is shown entering amplifier stage 60 and an amplified beam 64 is shown exiting amplifier 60. Very high CW gains are achievable using amplifier 60. For example, if the gain in each fold of the zig-zag is 10-20%, a total gain of 7 or 8 can be achieved using 10 folds.

Figure 9B:
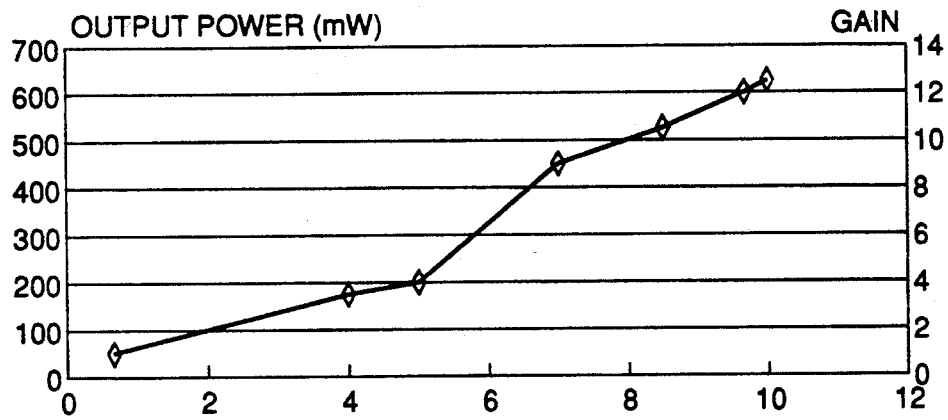

FIG. 9b is a graph of amplifier output versus pump power for an exemplary laser amplifier of the type shown in FIG. 9a. The graph of FIG. 9b represents actual test results obtained from a laser amplifier formed using a Nd:YLF block 5 mm by 5 mm by 20 mm. The block was pumped by a laser diode bar consisting of ten one watt diode arrays on 1 mm centers, each array having a 200 micron long emitting region. The pump radiation was collimated using a 250 micron diameter fiber lens, giving a pump area of about 300 microns$^2$. The injected beam size was about 350 microns in diameter and the fold angle of the optical path was about 5°.

For scaling the amplifiers of the present invention, the gain is a function of the beam diameter and varies inversely as the square of the pump volume and mode volume (assumed to be approximately equal). The practical limitation on the number of gain stages which may be cascaded in CW mode is reached when the loss per stage multiplied by the power into that stage equals the power gained by that stage.

Figure 10:
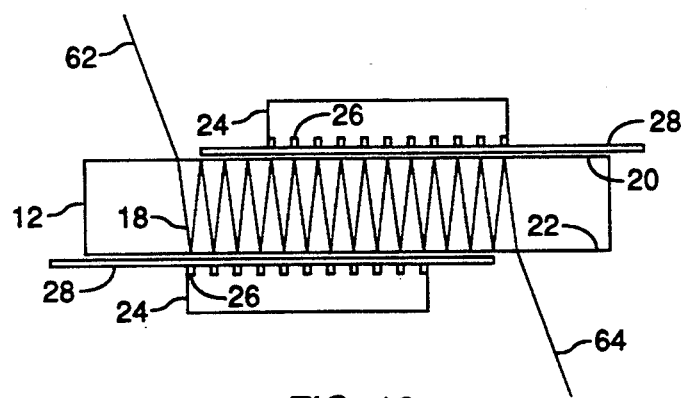
FIG. 10 is a top plan view of a laser amplifier stage according to a presently-preferred embodiment of the present invention, having its input and output on the opposite side of the laser medium and pumped by a transverse pair of diode bars.

A cascadable amplifier according to the present invention is also configurable in a way such that input beam 62 and output beam 64 emerge on opposite sides of block 12. Such a configuration is shown in FIG. 10 wherein laser block 12 has diode bars 24 containing laser diode arrays 26 on both sides 20 and 22 of block 12. In such a case, there will preferably be a fiber collimating lens 28 optionally positioned in between diode array 26 and side 20 and 22 of block 12. Otherwise diode arrays 26 may abut sides 20 and 22 of block 12. Like the embodiment of FIG. 9, input laser beam 62 is shown as is output laser beam 64. Those of ordinary skill in the art will recognize that the embodiment of FIG. 10 is identical to the embodiment of FIG. 2 without mirrors 14 and 16.

Figure 11:
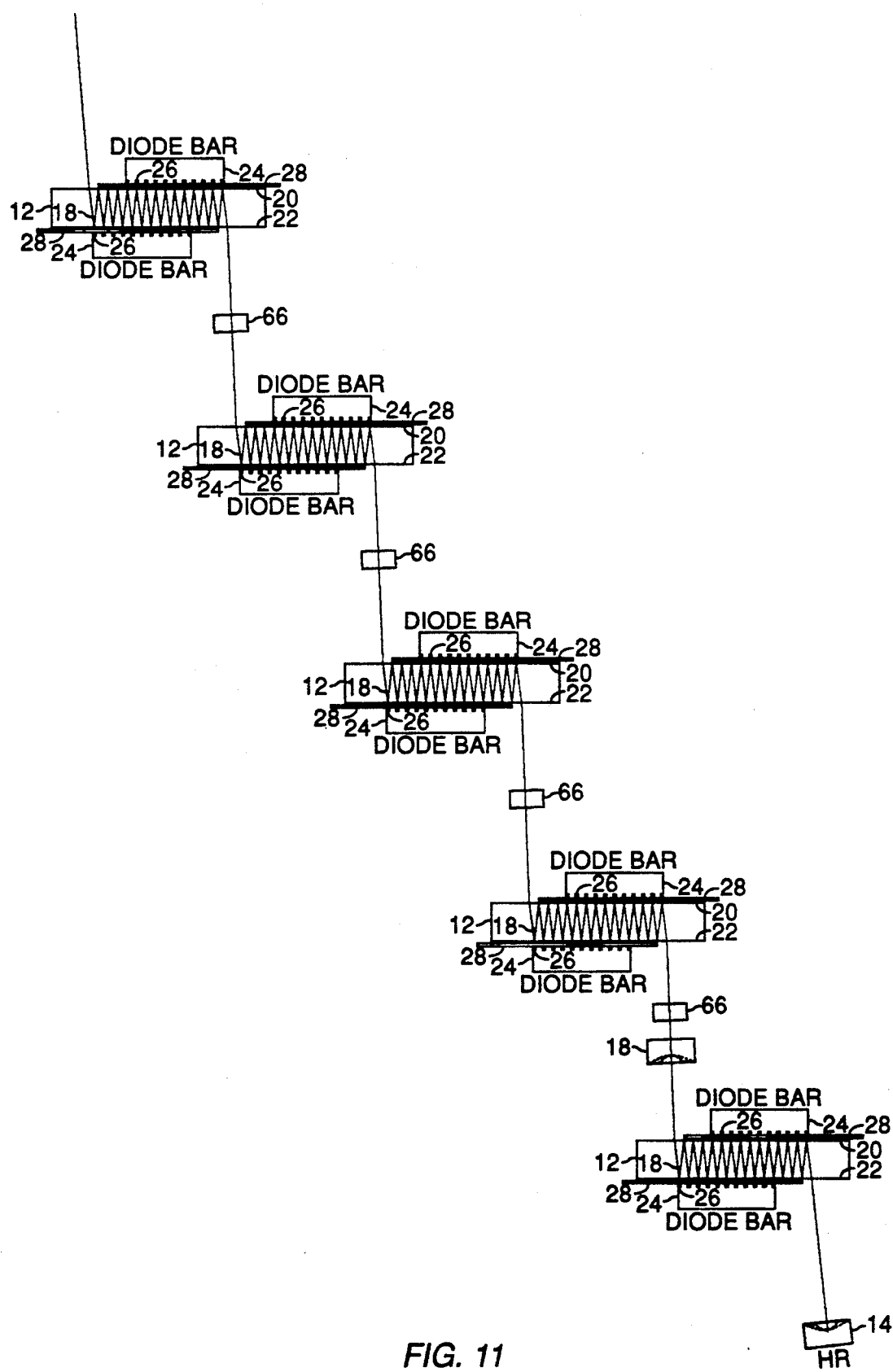
FIG. 11 is a top plan view of an oscillator/amplifier arrangement according to the present invention, showing four gain stages having their inputs and outputs on opposite sides of the laser medium, pumped by a transverse pair of diode bars.

Referring now to FIG. 11, a top plan view of an oscillator/amplifier arrangement according to the present invention, showing four gain stages having their inputs and outputs on opposite sides of the laser medium is shown. Laser oscillator 10 may be a laser such as the one described with respect to FIG. 2 herein, and includes resonator block 12, mirrors 14 and 16, diode bars 24 on sides 20 and 22 of resonator block 12 respectively, each containing diode arrays 26. Collimating lenses 28 are preferably interposed between diode bars 24 and sides 20 and 22 of resonator block 12.

Beam 62, emerging from lens 16, passes through mode matching means 66 before entering first amplifier stage 68. The purpose of mode matching means 66 is to adjust the mode radius in each amplifier segments so as to best extract the energy in the population inversion in that amplifier. Mode matching means 66 may be an image relay lens having an anti-reflection coating which performs 1:1 imaging from one stage to the next. For example, in a 10 cm block having 20 zig-zag legs, there is a distance of approximately 5 cm to the optical center of the bar along the optical path. A 10 cm lens, placed between two bars at approximately 15 cm from the surface of each block, will function satisfactorily as a mode matching means.

First amplifier stage 68 is identical to the embodiment disclosed with respect to FIG. 9. Additional amplifier stages 70, 72, and 74, are constructed identically to first amplifier stage 68. In addition, each amplifier has a mode matching means 66, interposed between it and the preceding amplifier. The discussion of FIG. 11 will be restricted to the operation of laser oscillator 10 and first amplifier section 68, it being understood by those of ordinary skill in the art that amplifier 70, 72, and 74 will operate in the exact same manner as amplifier 68, the only difference being that the average power input to those successive amplifiers will be larger due to the gain of the preceding stage.

The laser beam generated by oscillator 10 passes through output coupler mirror 16 and through mode matching means 66 and then enters first amplifier stage 68. As shown in FIG. 11, the optical path through amplifier 68 is a tightly-folded zig-zag, pumped at the vertices of the zig-zags. The amplified laser energy emerges as beam 64. The beam then passes through another mode-matching means 66 before proceeding to amplifier stage 70.

As a result of distributing the optical gain in the laser amplifier system depicted in FIG. 11, the heat generated by the pumping means is distributed throughout the gain stages 60, 70, 72, and 74. In this manner, the total pumping power per laser block is kept to an acceptable level, thus avoiding the problems of reduced laser efficiency and cooling difficulties which normally accompany a high-power solid-state laser material. Thermal focusing caused by the thermal gradient in the block will be at focal lengths much larger than any optical path in the block, and will not be able to cause damage to the block by focused laser energy.

Figure 12:
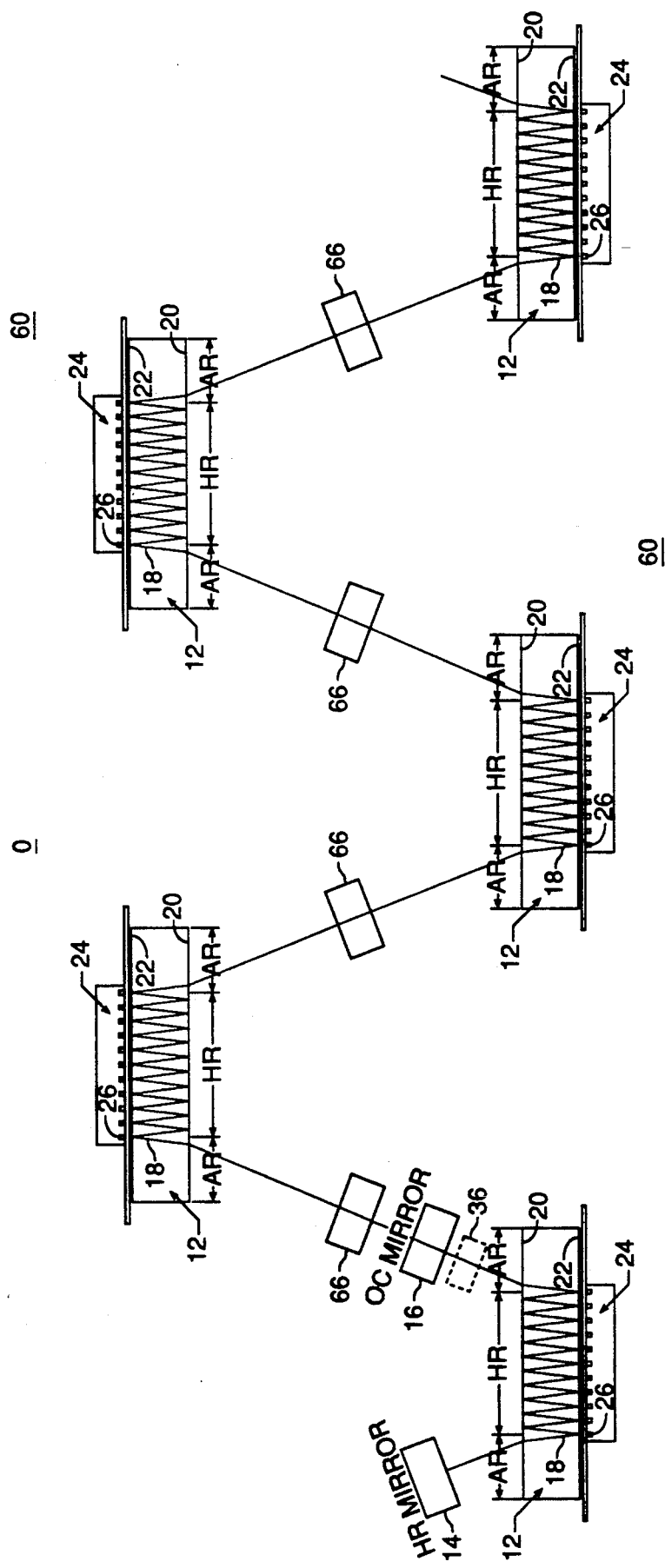
FIG. 12 is a top plan view of an oscillator/amplifier arrangement according to the present invention, showing four gain stages, having their inputs on the same side of the laser medium.

Referring now to FIG. 12, a top plan view of an oscillator/amplifier arrangement according to the present invention showing four gain stages having their inputs and outputs on the same side of the laser medium is shown.

As in the embodiment of FIG. 11, the embodiment of FIG. 12 contains oscillator 10 which generates a laser beam 62 which passes through out coupler mirror 16 and through mode matching means 66 to first amplifier stage 76. After the beam is amplified by first amplifier 76, it passes through mode matching means 66 and into second amplifying stage 78, where it is further amplified. The beam then passes through mode matching means 66 and into third amplifying state 80, where it is amplified again. The beam then passes through mode matching means 66 and finally through final amplifier stage 82. Each of amplifiers 76, 78, 80, and 82 may be identical to the embodiment disclosed with respect to FIG. 9.

As in the embodiment of FIG. 11, the total heat generated by the pumping medium of the entire laser system is distributed throughout the amplifiers 76, 78, 80 and 82. In this manner the total pumping power per laser block is kept to an acceptable level thus avoiding the problems of reduced laser efficiency and cooling difficulties which normally accompany a high-power solid-state laser.

Figure 13:
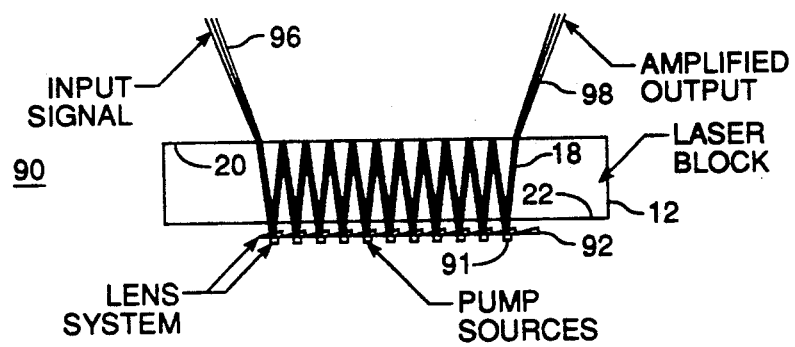
FIG. 13 is a top plan view of a single laser amplifier stage according to an alternate embodiment of the present invention.

Referring now to FIG. 13, another laser amplifier stage 90 according to the present invention is formed with a block 12 of Nd:YAG, Nd:YLF, Nd:YVO$_4$, or other solid-state laser material such that a tightly-folded zig-zag 18 at a preselected fold angle between a pair of opposed lateral sides 20 and 22 of block 12 much like the embodiment of FIG. 1, except for the absence of mirrors 14 and 16. Laser amplifier stage 90 may be cascaded. The surfaces of sides 20 and 22 of block 12 are coated with a suitable optical coating as previously described. Coating layers which form an HR coating are placed on the portions of sides 20 and 22 where the laser beam is to be reflected back into block 12 as previously described.

A plurality of laser diode pump sources 91 are optically coupled to the block 12. In the embodiment of FIG. 13, the laser diode pump sources are matched to the mode volume of amplifier 90 by means of collimating lenses 92 and by a lens system 94, which directs the pump radiation into block 12 such that the radiation from each pump source is directed along a leg of the tightly-folded optical path in block 12. Collimating lenses 92 may be microlenses such as lenses sold under the trademark SMILE by Corning Glass works of Corning, N.Y. Lens system 94 may be a fresnel lens system as is well known in the art. Those of ordinary skill in the art will easily contemplate other ways to optically couple the pump radiation from the laser diode pump sources into block 12.

As previously described, and more particularly associated with amplifiers because of their high gains at each node, the potential problem of parasitic transverse oscillation across block 12 between sides 20 and 22 exists and may be avoided by (1) employing an AR coating to create windows directly across from diode arrays 26, (2) selectively destroying the HR coating directly across from the diode arrays to increase the losses, or (3) by slightly wedging the normally parallel sides 20 and 22 of block 12.

A laser beam 96 is shown entering amplifier stage 90 on side 20 of block 12 and an amplified beam 98 is shown exiting amplifier 90 on side 20 of block 12. Those of ordinary skill in the art will recognize that amplified beam 98 could exit block 12 on side 22. Very high CW gains are achievable using amplifier 90. For example, if the gain in each fold of the zig-zag is 10-20%, a total gain of 7 or 8 can be achieved using 10 folds. The practical limitation on the number of gain stages which may be cascaded in CW mode is reached when the loss per stage multiplied by the power into that stage equals the power gained by that stage.

As an example, in an embodiment according to FIG. 13, fabricated using a YLF block and using the parameters of the embodiment of FIG. 9a, i.e., a mode diameter of about 300 microns, a pump diameter matched to this mode diameter, and a total pump power of about 10 watts, it is expected that a small signal gain of about 10 db or greater will be achieved.

Figure 14:
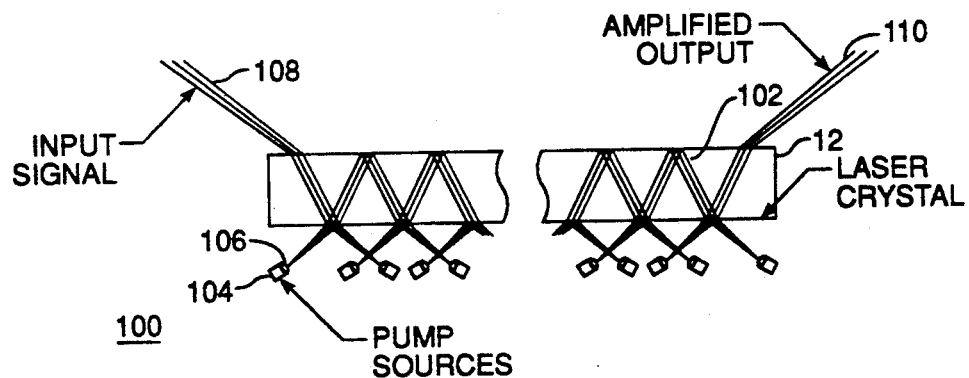
FIG. 14 is a top plan view of a single laser amplifier stage according to another embodiment of the present invention.

Referring now to FIG. 14, another embodiment of a laser amplifier according to the present invention is shown. Amplifier stage 100, which may be cascaded, is formed with a block 12 of Nd:YAG, Nd:YLF, Nd:YVCO$_4$, or other solid-state laser material such that a zig-zag optical path 102 is formed at a preselected fold angle between a pair of opposed lateral sides 20 and 22 of block 12. The fold angles of the optical path may be between about 10° and 30°. This embodiment has the advantage that the angles need not be small.

The surfaces of sides 20 and 22 are coated with a suitable optical coating as previously described. Coating layers which form an HR coating are placed on the portions of sides 20 and 22 where the laser beam is to be reflected back into block 12 as previously described.

A plurality of separate laser diode pump sources 104 are optically coupled into block 12. The laser diode pump sources are positioned with respect to block 12 such that the output radiation from each laser diode may be directed at the side of block 12 at a position corresponding with an apex of the zig zag optical path 102 in the block 12. Pump sources 104 may be laser diodes, designated 2460, manufactured by Spectra Diode Labs of San Jose, Calif., or laser diodes, designated SLD304W, manufactured by Sony Corporation, or other equivalent laser diodes. The angle of incidence of the pump radiation from each laser diode pump source 104 is chosen such that its pump radiation path in block 12 will coincide with a leg of the optical path in block 12. Each one of laser diode pump sources 104 is matched to the mode volume of amplifier 100. In the embodiment of FIG. 13, the matching is performed by means of a collimating lens 106, and by selecting the angle of incidence of the pump radiation on the side 22 of block 12 such that the path of the pump radiation within block 12 coincides with a leg of the optical path 102.

As previously described, the potential problem of parasitic transverse oscillation across block 12 between sides 20 and 22 may be avoided by (1) employing an AR coating to create windows directly across from the vertices of the optical path in the block, (2) selectively destroying the HR coating on the block on the side opposite the pump sources directly opposite the vertices of the optical path which are located on the pump source side of the block to increase the losses, or (3) by slightly wedging the normally parallel sides 20 and 22 of block 12.

A laser beam 108 is shown entering amplifier stage 100 on side 20 of bar 12 and an amplified beam 110 is shown exiting amplifier 100 on side 20 of bar 12. Those of ordinary skill in the art will recognize that amplified beam 110 could exit bar 12 on side 22. Very high CW gains are achievable using amplifier 100. For example, if the gain in each fold of the zig-zag is 10-20%, a total gain of 7 or 8 can be achieved using 10 folds. The practical limitation on the number of gain stages 104 which may be cascaded in CW mode is reached when the loss per stage multiplied by the power into that stage equals the power gained by that stage.

As an example, in an embodiment according to FIG. 14, using an YLF block and using the parameters of the embodiment of FIG. 9a, i.e., a mode diameter of about 300 microns, a pump diameter matched to this mode diameter, and a total pump power of about 10 watts, it is expected that a small signal gain of about 10 db or greater will be achieved.

When the amplifiers of FIGS. 9, 10, 13, and 14 are cascaded, very high powered solid-state lasers result. These lasers are highly efficient and compact and avoid the heat dissipation problems which accompany prior art high power solid-state lasers.

Changes and modifications in the specifically described embodiments can be carried out without departing from the scope of the invention which is intended to be limited only by the scope of the appended claims.

What is claimed is:

1. A mode-matched, diode-pumped, solid-state laser amplifier, including:
   a block of laser material having a pair of opposed sides,
   a zig-zag optical path within said block between said pair of opposed sides having a plurality of legs, pairs of which meet at vertices at a preselected fold angle,
   a plurality of laser diode pumping sources positioned adjacent to one of said opposed sides and optically coupled to said one of said opposed sides,
   means, interposed between said laser diode pump sources and said block, for aligning pump radiation from said laser diode pump sources with one of said vertices of said zig-zag optical path and with respect to said block such that the optical path of pump radiation from each of said pump sources is substantially coincident with one of said legs, and for mode matching the mode volume of said pump radiation with said optical path in said block.

2. The mode-matched diode pumped solid-state laser amplifier of claim 1 wherein said laser diode pumping sources are linearly spaced.

3. The laser amplifier of claim 1 wherein said plurality of laser diode pumping sources is a laser diode bar containing a plurality of separate laser diode arrays.

4. The laser amplifier of claim 1 wherein the mode volume is TEMOO.

5. The laser amplifier of claim 1 wherein said laser material is Nd:YAG.

6. The laser amplifier of claim 1 wherein said laser material is Nd:YLF.

7. The laser amplifier of claim 1 wherein said laser material is Nd:YVO$_4$.

8. The laser amplifier of claim 1 wherein the block is about 5 mm wide, the mode volume is about 300 microns in diameter, and the fold angle is about 5°.

9. The laser amplifier of claim 1 wherein the pumping source is a laser diode bar of 1 cm length containing ten 1 watt diode arrays, each 200 microns wide.

10. The laser amplifier of claim 1, further including means for suppressing parasitic oscillations across said block.

11. A mode-matched, diode-pumped, solid-state laser amplifier, including:
    a block of laser material having a pair of opposed sides,
    a zig-zag optical path within said block between said pair of opposed sides having a plurality of legs, pairs of which meet at vertices at a preselected fold angle,
    a plurality of laser diode pumping sources positioned adjacent to one of said opposed sides,
    a plurality of collimating lenses positioned in between said laser diode pumping sources and said block,
    means, interposed between said collimating lenses and said block, for aligning pump radiation from said laser diode pump sources with said vertices of said zig-zag optical path and with respect to said block such that the optical path of pump radiation from each of said pump sources is substantially coincident with one of said legs, and for mode matching said pump radiation with the mode volume of said optical path in said block.

12. The mode-matched diode pumped solid-state laser amplifier of claim 11 wherein said laser diode pumping sources are linearly spaced.

13. The laser amplifier of claim 11 wherein said plurality of laser diode pumping sources is a laser diode bar containing a plurality of separate laser diode arrays.

14. The laser amplifier of claim 11 wherein the mode volume is TEMOO.

15. The laser amplifier of claim 11 wherein said laser material is Nd:YAG.

16. The laser amplifier of claim 11 wherein said laser material is Nd:YLF.

17. The laser amplifier of claim 11 wherein said laser material is Nd:YVO$_4$.

18. The laser amplifier of claim 11 wherein the block is about 5 mm wide, the mode volume is about 300 microns in diameter, and the fold angle is between about 5° and 30°.

19. The laser amplifier of claim 11, further including means for suppressing parasitic oscillations across said block.

20. A mode-matched diode pumped solid-state laser amplifier system including a plurality of amplifier stages, each of said stages including:
    a block of laser amplifier material having a pair of opposed sides,
    a zig-zag optical path within said block between said pair of opposed sides having a plurality of legs, pairs of which meet at vertices at a preselected fold angle,
    a plurality of laser diode pumping sources positioned adjacent to one of said opposed sides,
    a plurality of collimating lenses positioned in between said laser diode pumping sources and said block,
    means, interposed between said collimating lenses and said block, for aligning pump radiation from said laser diode pump sources with one of said vertices of said zig-zag optical path and with respect to said block such that the optical path of pump radiation from each of said pump sources is substantially coincident with one of said legs, and for mode matching the mode volume of said pump radiation with said optical path in said block,
    said amplifier stages being optically coupled to one another in a cascade arrangement.

21. The mode-matched diode pumped solid-state laser amplifier system of claim 20 wherein said laser diode pumping sources are linearly spaced.

22. A mode-matched diode pumped solid-state laser amplifier system including a plurality of amplifier stages, each of said stages including:
    a block of laser amplifier material having a pair of opposed sides,
    a zig-zag optical path within said block between said pair of opposed sides having a plurality of legs, pairs of which meet at vertices at a preselected fold angle,
    a plurality of laser diode pumping sources positioned adjacent to one of said opposed sides,
    a plurality of collimating lenses positioned in between said laser diode pumping sources and said block,
    means, interposed between said collimating lenses and said block, for aligning pump radiation from said laser diode pump sources with said vertices of said zig-zag optical path and with respect to said block such that the optical path of pump radiation from each of said pump sources is substantially coincident with at least one of said legs, and for mode matching said pump radiation with the mode volume of said optical path in said block,
    said amplifier stages being optically coupled to one another in a cascade arrangement.

23. The mode-matched diode pumped solid-state laser amplifier system of claim 22 wherein said laser diode pumping sources are linearly spaced.

* * * * *